US008262788B2

(12) United States Patent
Rieger et al.

(10) Patent No.: US 8,262,788 B2
(45) Date of Patent: Sep. 11, 2012

(54) AIR FILTER HOUSING FOR A COMPACT AIR FILTER ELEMENT

(75) Inventors: Mario Rieger, Freiberg (DE); Werner Blossey, Benningen (DE)

(73) Assignee: Mann + Hummel GmbH, Ludwigburg (DE)

( * ) Notice: Subject to any disclaimer, the term of this patent is extended or adjusted under 35 U.S.C. 154(b) by 620 days.

(21) Appl. No.: 12/302,415

(22) PCT Filed: Apr. 18, 2007

(86) PCT No.: PCT/EP2007/053754

§ 371 (c)(1), (2), (4) Date: Jul. 31, 2009

(87) PCT Pub. No.: WO2007/137910

PCT Pub. Date: Dec. 6, 2007

(65) Prior Publication Data

US 2009/0320420 A1 Dec. 31, 2009

(30) Foreign Application Priority Data

May 29, 2006 (DE) ........................ 10 2006 025 230

(51) Int. Cl.
*B01D 46/00* (2006.01)
*F01N 1/02* (2006.01)
*F01N 3/021* (2006.01)

(52) U.S. Cl. ................... 96/384; 55/385.3; 55/DIG. 21; 96/388; 121/231; 121/249

(58) Field of Classification Search ................. 55/385.3, 55/DIG. 21, DIG. 30; 181/227, 228, 231, 181/273, 276, 282, 249; 96/380, 384, 388
See application file for complete search history.

(56) References Cited

U.S. PATENT DOCUMENTS

| | | | | |
|---|---|---|---|---|
| 4,851,015 | A * | 7/1989 | Wagner et al. | 95/15 |
| 5,106,397 | A * | 4/1992 | Jaroszczyk et al. | 96/388 |
| 5,338,903 | A * | 8/1994 | Winberg | 181/231 |
| 5,792,247 | A * | 8/1998 | Gillingham et al. | 96/386 |
| 6,673,136 | B2 * | 1/2004 | Gillingham et al. | 95/273 |
| 6,852,151 | B2 * | 2/2005 | Bloomer | 96/386 |

FOREIGN PATENT DOCUMENTS

| | | | |
|---|---|---|---|
| DE | 743418 | C * | 12/1943 |
| DE | 743418 | C | 12/1943 |

(Continued)

OTHER PUBLICATIONS

Machine translation of DE 944405, published Jun. 14, 1956.*

(Continued)

*Primary Examiner* — Robert Clemente
(74) *Attorney, Agent, or Firm* — James Hasselbeck

(57) ABSTRACT

An air filter housing (10) for at least one compact air filter element (20) has at least one filter chamber (1) that at the ends has at least one hose connector socket (2, 3), respectively. The compact air filter element (20) is insertable chamber into the filter chamber between the hose connector sockets (2, 3) with sealing of the cross-section of the filter. At least one resonator chamber element (5, 6) is attached to the air filter housing (10) and is connected with the filter chamber (1) by at least one air-conducting channel (7, 8, 9) or slot.

7 Claims, 3 Drawing Sheets

FOREIGN PATENT DOCUMENTS

| | | | | |
|---|---|---|---|---|
| DE | 944405 | C | | 6/1956 |
| DE | 944405 | C | * | 6/1956 |
| DE | 19951408 | A1 | | 5/2001 |
| DE | 19951408 | A1 | * | 5/2001 |
| FR | 192801 | A | | 10/1959 |
| FR | 1192801 | A | * | 10/1959 |
| FR | 1233817 | A | | 10/1960 |
| FR | 1233817 | A | * | 10/1960 |
| FR | 1356989 | A | * | 4/1964 |
| FR | 1356989 | A | | 4/1964 |
| GB | 602855 | A | | 6/1948 |
| GB | 602855 | A | * | 6/1948 |

OTHER PUBLICATIONS

Machine translation of FR 1233817, published Oct. 12, 1960.*
Machine translation of FR 1356989, published Apr. 3, 1964.*
Machine translation of FR 1192801, published Oct. 28, 1959.*
Machine translation of DE 743418, published Dec. 24, 1943.*
Machine translation of DE 19951408, published May 3, 2011.*

* cited by examiner

AIR FILTER HOUSING FOR A COMPACT AIR FILTER ELEMENT

TECHNICAL FIELD

The invention concerns an air filter housing for at least one compact air filter element, comprising at least one filter chamber that is provided at its ends with at least one hose connector socket, respectively, wherein the compact air filter element is insertable between the hose connector sockets with sealing of the cross-section of the filter chamber.

PRIOR ART

Compact air filter elements are comprised of a corrugated filter paper and a smooth filter paper. The filter papers are glued together and then wound together to a filter element of the desired size. In this connection, gluing is done by bead-shaped application of the pasty adhesive in the edge areas such that the interstices between the corrugated layer and the smooth layer are alternatingly closed off at the two end faces so that no direct flow through the channels formed between the filter papers is possible. An air flow, when flowing from the unfiltered air side to the filtered air side, first reaches only a branch channel, then passes through the filter paper and flows out from a branch channel on the other side. In comparison to conventional folded filters, these compact air filters have the advantage that for the same size a larger filter surface area is provided or for the same filter surface area a smaller size is made possible so that accordingly also the air filter housing for the compact air filter element can have a smaller size. The advantage with regard to the size however entails the disadvantage that the acoustic damping is worsened as a result of the significantly reduced housing volume for compact air filter elements.

DISCLOSURE OF THE INVENTION

Object of the invention is therefore to provide an air filter housing for a compact air filter element with improved acoustic properties that is of a simple and inexpensive design. This object is solved by an air filter housing having the features of claim 1.

The air filter housing, known in general, is supplemented by an additional resonator chamber element that is connected to the actual filter space by at least one air-conducting channel or slot. In this way, an acoustic influence on pressure vibrations in the air flow according to the principle of a Helmholtz resonator is realized wherein by means of the size of the volume of the resonator chamber and by means of location and size of the connecting channels as parameters the acoustic properties can be affected. By means of integration into the air filter housing or the attachment to the exterior in accordance with the present invention, no additional space for a separate acoustic damping means is required.

The terms "channel" or "slot" are used in the following interchangeably for cutouts that are provided in a wall that separates the main chamber as a filter chamber from an auxiliary chamber serving as a resonance chamber and that have an acoustically effective opening width.

A first embodiment provides that on the outer circumference of the filter chamber one or several, preferably box-shaped, resonator chamber elements are to be arranged and to be connected by at least one air-conducting channel or slot to the inner filter chamber.

It is in particular advantageous to provide an annular chamber element in the area of the transition from the hose connector socket to the filter chamber. The transition from the smaller cross-section of the hose connector socket to the greater cross-section of the filter chamber is predetermined. An annular chamber element that is attached in this area thus utilizes the already present space inside or outside of the air filter housing without requiring an enlargement of the housing.

The annular chamber element can be divided into partial chambers by webs that extend in particular radially so that in particular also chambers of different sizes are formed and, accordingly, different sound frequencies can be affected. Each partial chamber is in communication with the interior of the air filter housing by at least one channel or slot.

An especially simple solution provides that the annular chamber element is formed of an annular cover section and an annular hoop section. The annular hoop section is directly welded to the large filter chamber and the annular cover section is welded to the hose connector socket. In this way, it is also possible to retrofit an already existing production air filter housing with integrated bypass resonator without this requiring an entirely new development of the air filter housing.

The connecting channels can extend either radially into the annular chamber element, in particular beginning at the narrow cross-section of the hose connector socket. Alternatively, connecting channels can be provided that extend approximately axially, i.e. parallel to the flow direction.

The annular chamber element can also be arranged in the interior of the filter chamber inasmuch as in the filter chamber a cavity is provided by the filter chamber not being completely filled by the compact air filter element.

Advantageously, the resonator chamber elements are filled with a damping material in order to provide additional absorption of sound energy. Lining the chambers and/or the filter housing with damping material can serve the same purpose.

Moreover, it can be provided that at the intake side in the air filter housing a so-called inlet tulip is formed, i.e., a channel that initially continuously tapers and then suddenly widens so that a pressure wave reflection occurs here.

These and further features of preferred embodiments of the invention can be taken from the claims as well as the description and the drawing wherein the individual features taken alone or combined in form of subcombinations can be realized for embodying the invention and also in other fields and can represent advantageous as well as individually protectable embodiments for which protection is sought here.

BRIEF DESCRIPTION OF THE DRAWINGS

The invention will be explained in the following with reference to the drawing in more detail. The FIGS. 1 and 2 each show different embodiments of an air filter housing according to the invention in section illustration, respectively.

EMBODIMENTS OF THE INVENTION

Figure 1:
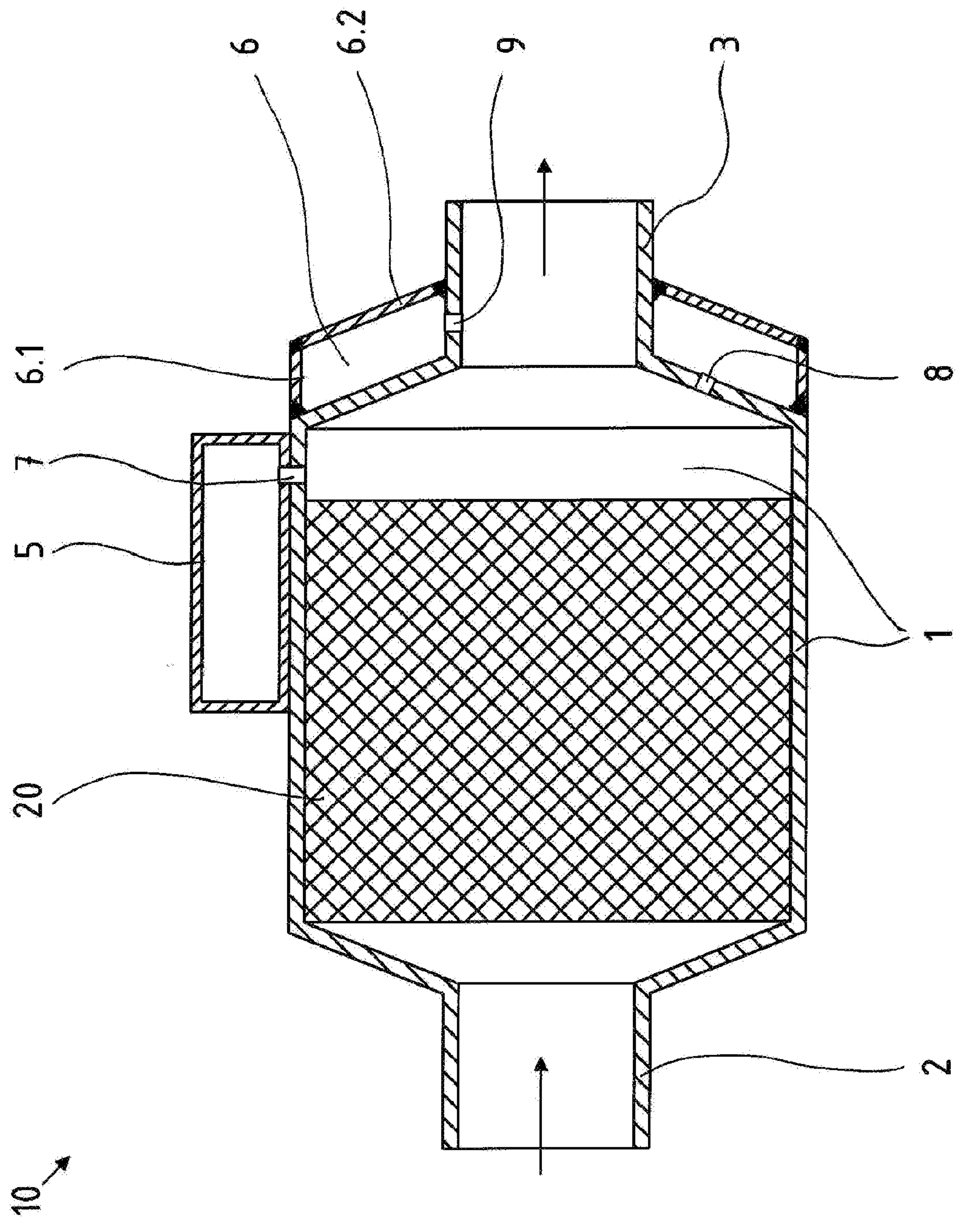

FIG. 1 shows a first embodiment of an air filter housing 10 according to the invention that comprises essentially a filter chamber 1 that tapers at both its ends to form hose connector sockets 2, 3. In the filter chamber a compact air filter element 20 is inserted with flow coming from the inlet connector socket 2 passing through.

The taken-in air passes the compact air filter element 20 and is then discharged through the discharge connector socket 3.

About the connector socket 3 there is an annular chamber element 6 as a first resonator chamber element. It forms an annular cavity that in the illustrated embodiment on the one hand is connected by means of radial channels 9 to the interior of the hose connector socket 3 and on the other hand by means of approximately axial channels 8 with a cavity located adjacent to the compact air filter element 20 in the filter chamber 1.

The annular chamber element 6 is of a very simple configuration in that the air filter housing 10, generally known with respect to the elements 1, 2, and 3, is provided with channels 8, 9 and an annular hoop section 6.1, e.g. in the form of a pipe section, is attached externally on the air filter housing 10. For example, when the air filter housing is made of plastic material an appropriate plastic hoop can be welded thereto. The annular cover section 6.2 then separates between its outer edge at the annular hoop section 6.1 and its inner edge at the connector socket 3 an air volume that is connected to the interior of the air filter housing 10 only by means of the channels 8, 9. The thus produced cavity is acoustically effective and enables to affect acoustically detectable vibrations in the air column that is being passed through the air filter housing 10, i.e., to dampen them or to even eliminate them completely.

The frequency ranges that can be affected are directly correlated with the air chamber volume of the resonator chamber. In order to provide differently sized volumes for different frequency spectra, the embodiment according to FIG. 1 further provides that on the exterior side of the air filter housing 10, in particular on the housing wall of the large filter chamber 1, at least one additional box-shaped resonator chamber element 5 is to be arranged. It is shaped such that it is matched to the outer contour of the air filter housing 10 and can be fixedly connected thereto. By means of an air-conducting channel 7 an acoustically effective connection is realized again.

Figure 2:
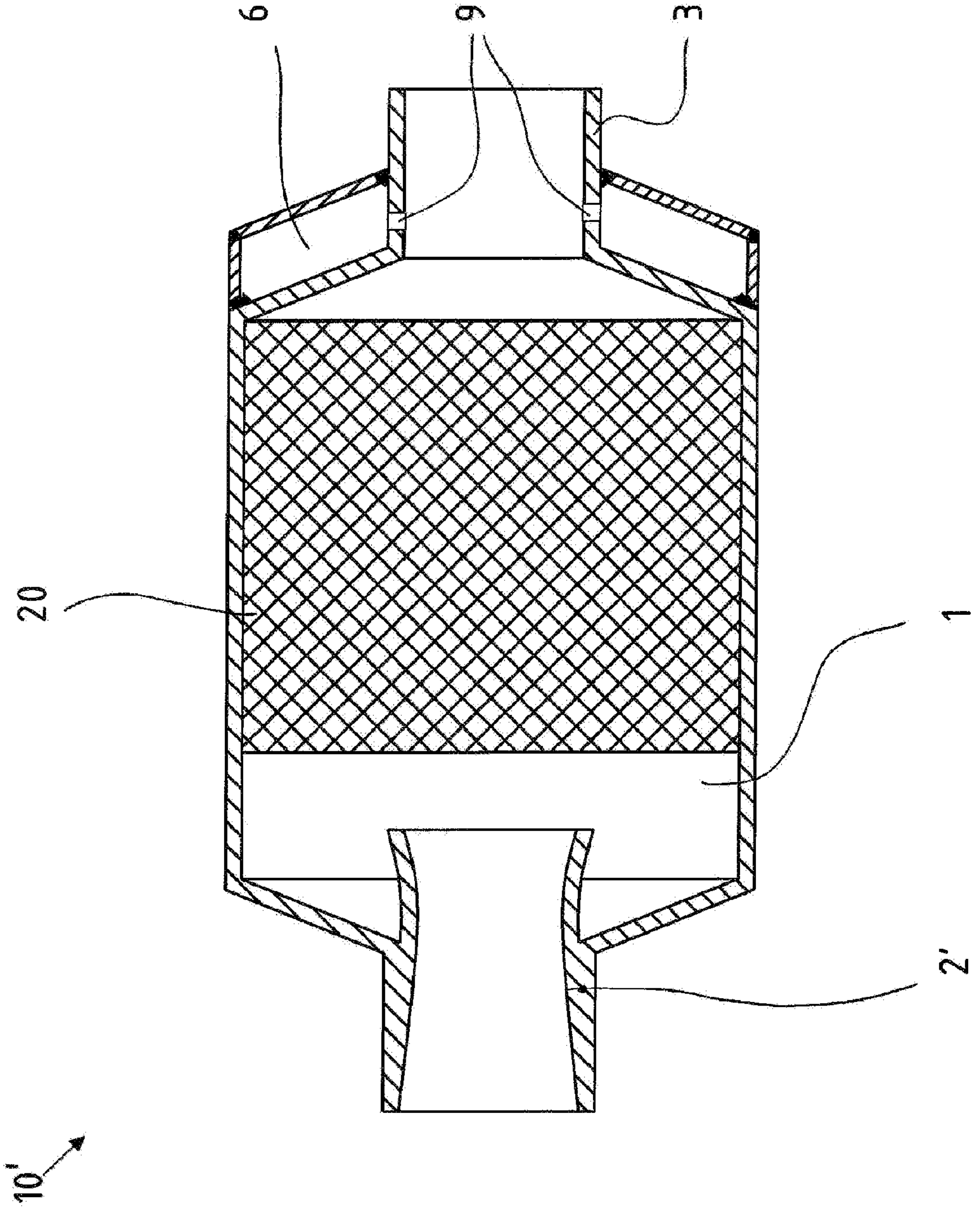

FIG. 2 shows a similarly constructed air filter housing 10'. On the outer circumference of the filter chamber 1 there are however no resonator chamber elements provided. The annular chamber element 6 in this embodiment, as in the preceding embodiment, is present and communicates by radial bores 8 with the interior of the hose connector socket 3 that acts as an outlet opening. The interior of the hose connector socket 2' in this embodiment is configured as a so-called inlet tulip, i.e., the cross-section tapers and then widens shortly before opening into a plenum wherein the plenum in this case is a cavity present in front of the air filter element 20 in the filter chamber 1.

Figure 3:
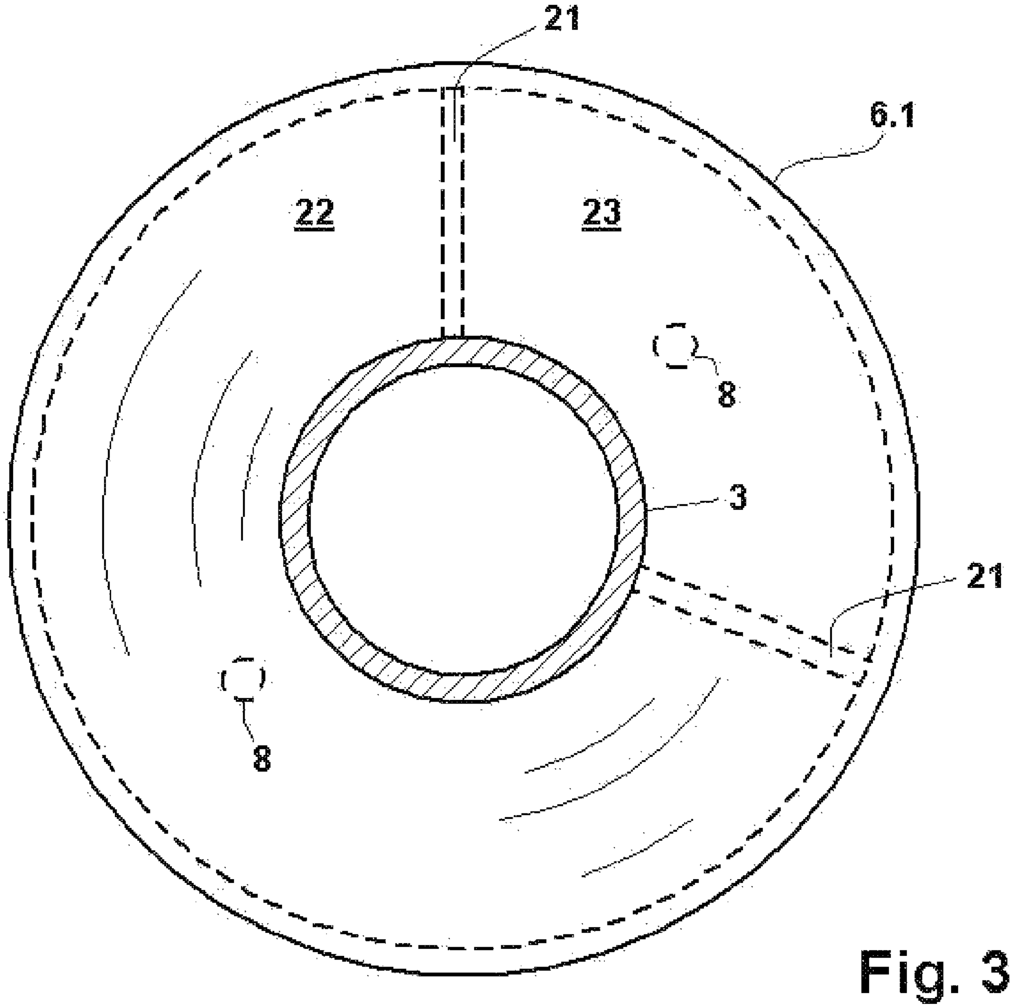
FIG. 3 provides an end view of another embodiment of the filter housing depicting the cover section including interior webs forming partial chambers.

FIG. 3 provides an end view of another embodiment of the filter housing depicting the cover section including interior webs forming partial chambers. The annular chamber element 6 (discussed previously with FIGS. 1 and 2) may be divided in a plurality of partial chambers (as discussed earlier in paragraph FIG. 3 illustrates an annular chamber element 6 divided into a first partial chamber 22 and a second partial chamber 23 by radial webs 21 that extend radially, so that chambers of different sizes or volumes are formed and, accordingly, different sound frequencies can be affected. FIG. 3 illustrates two partial chambers, however it is to be understood that any number of partial chambers may be provided. Each partial chamber 22, 23 is in communication with the interior of the air filter housing 10 by at least one axial channel 8 or slot, either through the hose connector socket (2 or 3) or into the filter chamber 1.

The invention claimed is:

1. Air filter housing for at least one compact air filter element, comprising at least one filter chamber, an inlet hose connection socket, a discharge hose connection socket, said sockets arranged on axially opposing ends of said at least one filter chamber, a resonator chamber element arranged on and attached to an outer circumference of said at least one filter chamber and connected by an air-conducting channel or slot to said at least one filter chamber, said channel or slot extending through a filter housing wall separating said at least one filter chamber from a resonator chamber of said resonator chamber element, wherein the compact air filter element is insertable between the hose connector sockets with sealing of the cross-section of the filter chamber, wherein said filter housing includes a transition area tapering between said outer circumference of said at least one filter chamber and said axially opposing ends of said filter chamber to form said hose connection sockets, wherein said resonator chamber element is configured as an annular chamber element attached to said transition area and surrounding said discharge hose connection socket, wherein the annular chamber element is connected by an axial channel or slot extending through said housing transition area into the filter chamber.

2. Air filter housing according to claim 1, wherein the air filter housing is of a two-part configuration comprised of a filter chamber part and a cover part and that the annular chamber element is arranged on the cover part.

3. Air filter housing according to claim 1, wherein the annular chamber element is configured of an annular hoop section having a first end attached to externally on the filter housing and an annular cover section attached at its outer edge to said annular hoop section and attached at its inner edge to the discharge hose connection socket.

4. Air filter housing according to claim 3, wherein the annular hoop section adjoins an end face of an outer housing wall of the filter chamber and the annular cover section extends between the annular hoop section and the discharge hose connection socket.

5. Air filter housing according to one of claims 1, 2, 3, or 4, wherein the annular chamber element is divided by radial webs into partial chambers of which each is connected by a channel to the interior of the discharge hose connection socket and/or to the filter chamber.

6. Air filter housing according to claim 5, wherein the partial chambers have different volumes.

7. Air filter housing according to one of claims 1, 2, 3, or 4, wherein at least one of the hose connection sockets in the area where it opens into the filter chamber is configured as an inlet tulip in which the inlet cross section tapers and then widens shortly before opening into a cavity in front of said compact air filter element.

* * * * *